Sept. 12, 1933.     D. U. GOULD, JR     1,926,981
AUTOMATIC FILM CLEANER
Filed March 14, 1932     3 Sheets-Sheet 1

INVENTOR
DON U. GOULD JR.
BY ATTORNEY
Clarence A. O'Brien

Sept. 12, 1933.  D. U. GOULD, JR  1,926,981
AUTOMATIC FILM CLEANER
Filed March 14, 1932   3 Sheets-Sheet 2

INVENTOR
DON U. GOULD JR.
BY ATTORNEY
Clarence A. O'Brien

Sept. 12, 1933.  D. U. GOULD, JR  1,926,981
AUTOMATIC FILM CLEANER
Filed March 14, 1932  3 Sheets-Sheet 3

Inventor
Don U. Gould, Jr.

By Clarence A. O'Brien
Attorney

Patented Sept. 12, 1933

1,926,981

UNITED STATES PATENT OFFICE 1,926,981

AUTOMATIC FILM CLEANER

Don Ulinn Gould, Jr., Sherburne, N. Y.

Application March 14, 1932. Serial No. 598,342

1 Claim. (Cl. 15—100)

This invention relates to a device for cleaning films for motion picture machines, the general object of the invention being to provide brush means for cleaning the film as it is run through the machine, so as to remove dust, dirt and the like from the film.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Fig. 5 is a section on line 5—5 of Fig. 2.

Figure 1:
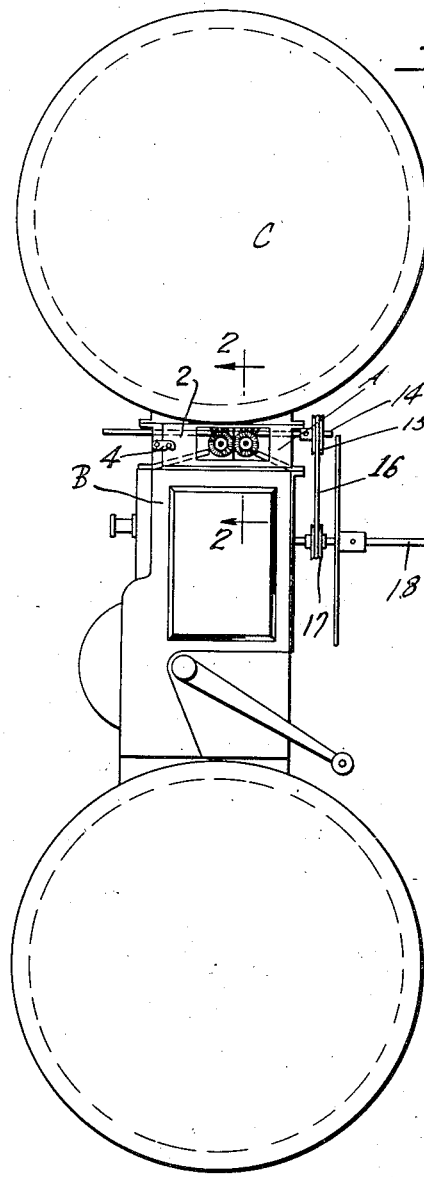
Figure 1 is an elevation showing a machine equipped with the invention.
Figure 2:
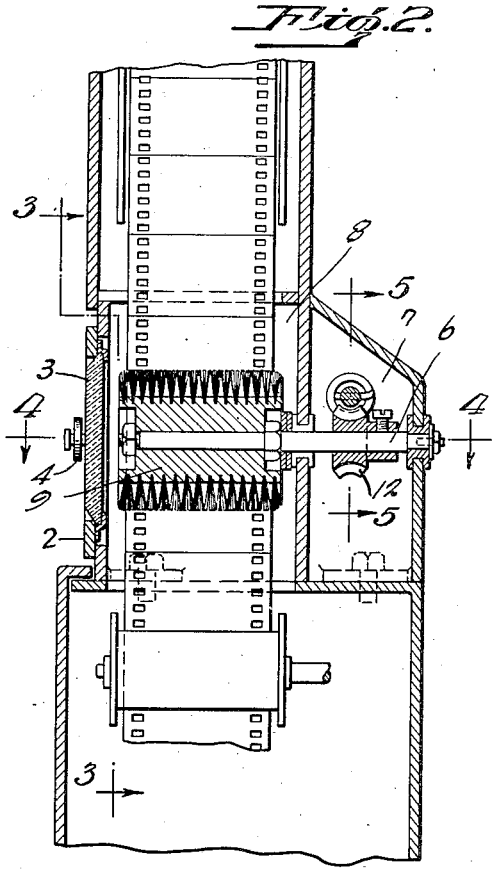
Fig. 2 is an enlarged section on line 2—2 of Fig. 1.
Figure 3:
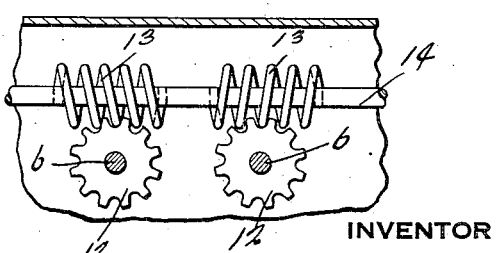
Fig. 3 is a section on line 3—3 of Fig. 2.
Figure 3:
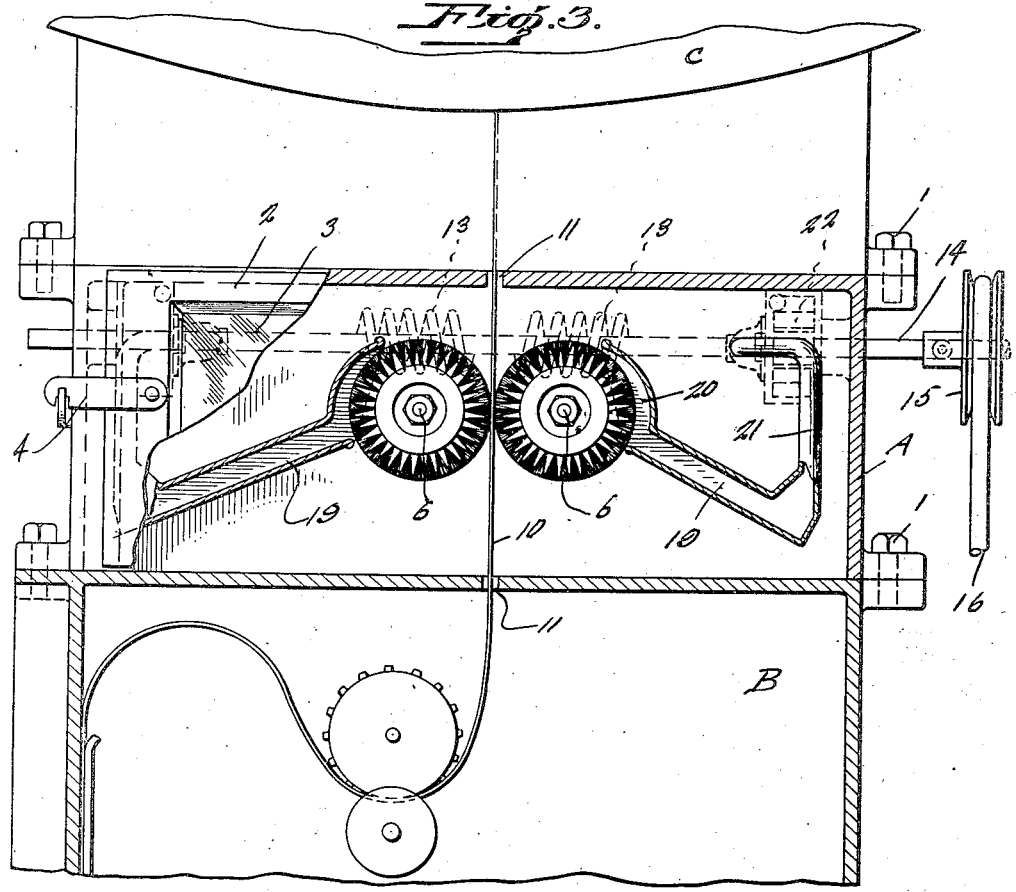
Figure 4:
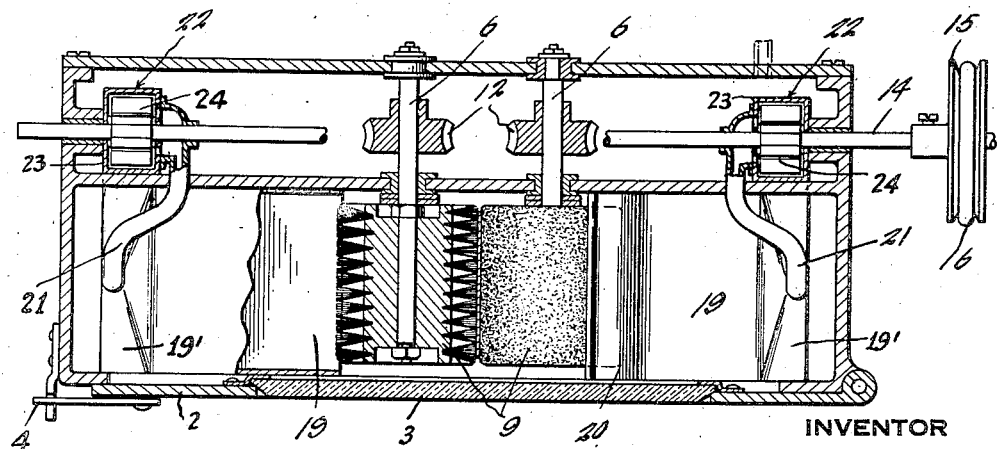
Fig. 4 is a section on line 4—4 of Fig. 2.
Figure 6:
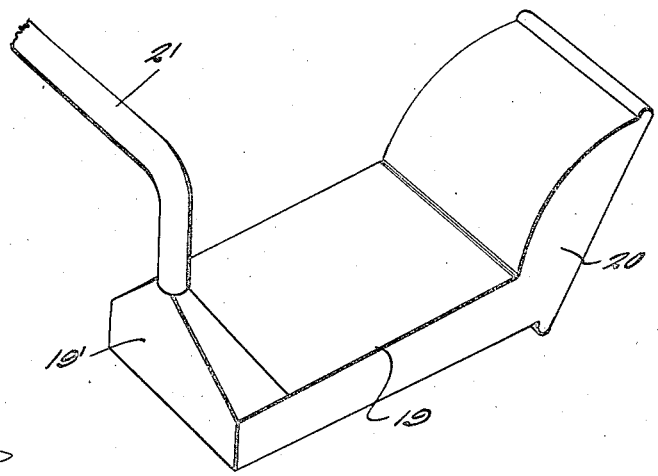
Figure 6 is a perspective view of one of the chutes and its hood and showing a part of the conduit leading from the chute to the suction device.
Figure 7:
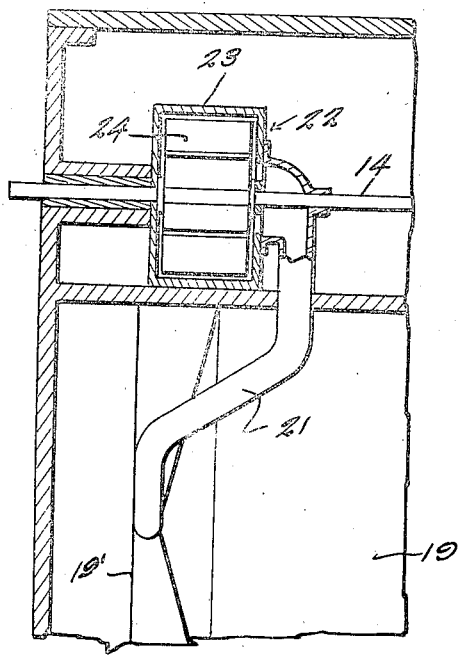
Figure 7 is a horizontal sectional view, with parts in elevation, showing how the conduit leads from the chute to the suction device.
Figure 8:
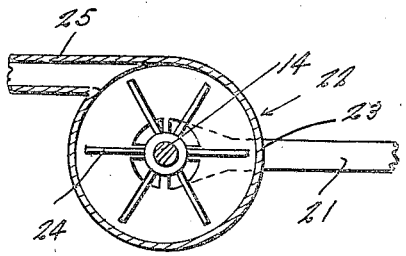
Figure 8 is a sectional view through the suction device.

As shown in these drawings, I locate a small casing section A between the projector part B of the machine, and the upper magazine C, this casing section being connected to the parts C and B by the bolts 1. One side of the casing section contains the door 2 having a glass panel 3 therein and which is provided with latch means 4 for holding it in closed position.

A pair of shafts 6 is journalled in the two rear walls of this section, said walls forming a chamber 7 at one side of the main chamber 8 of the casing section, and said shafts are extended through said chamber 8 and the parts of the shafts located in said main chamber 8 carry the cylindrical brushes 9 for brushing the film strip 10 as it passes through the main chamber, the bottom and top of said main chamber, being formed with the slots 11 for the passage of the film strip.

Within the chamber 7 each shaft is provided with a grooved cog wheel or pinion 12 and these pinions are engaged by the oppositely arranged worms 13 on a shaft 14 which passes through the casing section and has a pulley 15 on one end thereof over which passes a belt 16 and this belt also passes over a pulley 17 on the shutter shaft 18. Thus the brushes are driven in opposite directions from the shutter shaft and opposite to the travel of the film, so that they will clean the dirt and dust and other foreign matter from the film strip, and the brushes can be rotated faster than the film is moving.

The brushes are made of soft brush material which will give when the film has a cut on it. The matter collecting on the brushes is deposited into the chutes 19 which are each provided with a hood 20 at its upper end, for partly enclosing the brush. The chutes slope downwardly and outwardly towards the end walls of the casing section, and are connected by the conduits 21 with the vacuum producing means 22, the rotors of which are connected with the shaft 14 and these means 22 may discharge into any suitable container wherever desired. As shown, each chute 19 is of a width to fit snugly between the front and rear walls of the chamber 8 and the rear end of each chute has an upwardly extending portion 19' to which one end of the conduit 21 is connected. The other end of the conduit is connected with the casing 23 of the suction device, the rotor of which is shown at 24 and the discharge at 25.

As the drive from the shutter shaft to the shaft 14 is a belt and pulley one, the drive is noiseless.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

A film cleaning attachment for a motion picture machine comprising a casing having a partition therein dividing the same into two chambers, the walls of one chamber having alined slots therein for the passage of the film strip through the chamber, a pair of shafts rotatably supported by said partition and one wall of the casing with the shafts extending into said chamber through which the film strip passes, brushes connected to said shafts and located in the film chamber and between which the film passes, a drive shaft extending longitudinally through the other chamber, worm gearing connecting the drive shaft with the first-mentioned shafts for rotating the brush carrying shafts in opposite directions, a pair of suction casings located in said other chamber through which the drive shaft passes, a rotor in each suction casing and attached to the drive shaft, a pair of chutes in the film chamber each having enlarged inner ends for receiving portions of the brushes, and means for connecting the outer ends of the chutes to the suction casings.

DON ULINN GOULD, Jr.